May 10, 1932.    J. F. CANTELL    1,857,528
COUPLING
Filed Nov. 13, 1931
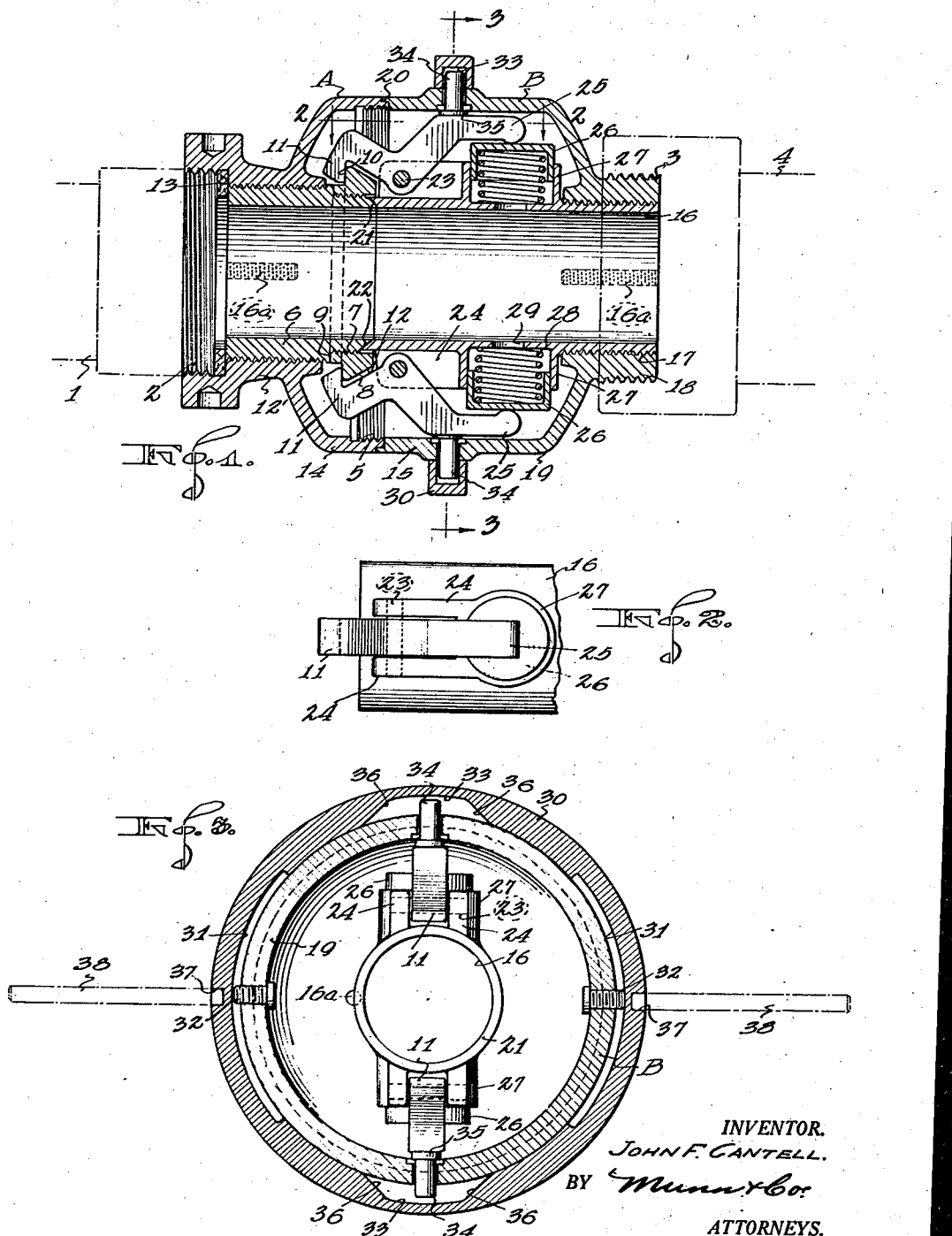
INVENTOR.
JOHN F. CANTELL.
BY Munn & Co.
ATTORNEYS.

Patented May 10, 1932

1,857,528

UNITED STATES PATENT OFFICE

JOHN F. CANTELL, OF SAN FRANCISCO, CALIFORNIA

COUPLING

Application filed November 13, 1931. Serial No. 574,807.

An object of my invention is to provide an improvement over the form of the device shown in my co-pending application, Serial No. 469,174, filed July 10, 1930. In my co-pending application, I showed spring-pressed pistons for actuating catches for holding the two parts of the coupling together.

In the present form of the invention, I also show spring-pressed pistons for moving catches into operative position for holding the two parts of the coupling together, but I further show communications between the pistons and the interior of the coupling, so that the pressure of the fluid passing through the coupling will be utilized in urging the hooks into operative position. From this, it will be apparent that the greater the force or pressure of the fluid passing through the coupling, the greater will be the force exerted by the gripping members in holding the two parts of the coupling together. The hooks of the coupling are so fashioned as to urge the two parts of the coupling toward each other with greater force as the pressure of the fluid passing through the coupling increases.

A further object of my invention is to provide a device of the type described which makes use of a novel release mechanism for freeing the two parts of the coupling without the necessity of unscrewing one part from the other, as is the case in standard couplings. The device is simple in construction, and the working parts are entirely housed by a casing when the two parts of the coupling are secured together.

Other objects and advantages will appear in the following specification, and the novel features of the device will be particularly pointed out in the appended claims.

My invention is illustrated in the accompanying drawings forming a part of this application, in which Figure 1 is a longitudinal section through the device showing portions in elevation;

Figure 2 is a section along the line 2—2 of Figure 1; and

Figure 3 is a section along the line 3—3 of Figure 1 showing parts of the device in elevation.

In carrying out my invention, I provide a coupling consisting of the parts A and B. The coupling is designed primarily for the quick connection of fire hoses to each other and to the water hydrant. The part A in Figure 1 is shown connected to a hose 1, indicated by dotted lines, the end of the hose being threaded into a threaded portion 2 of the part A. Figure 1 also shows the part B as being threaded at 3 and as receiving the end of a hose section 4. When the device is used on a water hydrant, the part A is threaded onto the water outlet of the hydrant and remains a permanent part thereof, if desired. When the part B is not connected to the part A, a closure, not shown, may be secured to the part A by means of the threaded portion 5.

I will now describe the structure of the coupling. The part A has a central tubular portion 6 threaded at 7 for receiving an annular head 8. The tubular portion 6 has a shoulder 9 against which the head 8 abuts, and the head has a shoulder 10 for receiving catches 11 that are carried by the part B and which will hereinafter be described more fully. The head 8 also has a cam portion 12 for guiding the catches 11 onto the shoulder 10.

The tubular member 6 is threaded in a casing 12', and this casing has a gasket 13 disposed adjacent to the threaded portion 2 so as to form a water-tight seal with the fire hose or the water hydrant. The casing 12' is also enlarged, as at 14, to form a part of a housing 15 that encloses the working parts. The enlarged portion 14 has the internally-threaded portion 5. The part B has a tubular portion 16 that is threaded at 17 into a casing 18. The casing is enlarged, as at 19, and forms the other part of the housing 15. The enlarged portions 14 and 19 are cut in the manner shown to form a joint 20.

The tubular portion 16 has a rounded countersunk end 21 that is designed to snugly fit a rounded end 22 of the tubular portion 6. The abutting of these two ends provides a liquid-tight seal between the tubular portions 6 and 16.

The catches 11 are pivoted at 23 between upstanding lugs 24, (see Figure 2), that are integral with the tubular portion 16. The free ends 25 of the catches bear against spring-pressed pistons 26, and these pistons are slidably received in cylinders 27 that are integral with the tubular portions 16. Springs 28 urge the pistons 26 against the catches 11 and tend to move the catches into locked position so as to hold the parts A and B of the coupling together.

The tubular portion 16 has openings 29 in its walls for allowing the fluid to gain access to the cylinders 27 and to force the catches 11 into operative position. It will be seen from this construction that the greater the pressure of the fluid passing through the coupling, the greater will be the force of the pistons 26 on the catches 11, and the construction of the catches is such that as the force is increased, they will cause the head 8 to move the tubular portion 6 with greater force against the tubular portion 16. In this way, the increasing of the force of the fluid will cause the parts of the coupling to provide a more liquid-tight seal.

In Figure 3, I show a novel means for moving the catches 11 into inoperative position when it is desired to free the part B from the part A. A ring 30 encircles the enlarged portion 19 of the casing 18 and has grooves 31 provided on its inner surface for receiving pins 32 that are carried by the portion 19. The pins 32 not only prevent axial movement of the ring 30, but also limit the rotational movement of the ring with respect to the portion 19.

The ring 30 also has recesses 33 for receiving the outer ends of pins 34. The pins are carried by the portion 19 and have enlarged heads 35 that bear against the catches 11. Cam portions 36 are provided in the ring 30, and when the ring is rotated with respect to the portion 19 in either direction, the cam portions 36 will move the pins 34 inwardly and the pins in turn will swing the catches 11 into open or inoperative position. The part B of the coupling may now be quickly removed from the part A without the necessity of unscrewing any parts. The ring 30, if desired, may be provided with openings 37 for removably receiving handles 38 that may be used in rotating the ring.

When it is desired to secure the part B of the coupling to the part A, the portions 14 and 19 of the casing 12' and 18 are brought into registration, and this will bring the catches 11 into the desired position. The ring 30 may now be rotated so as to free the pins 34, and the spring-pressed pistons will now cause the catches 11 to lock the parts A and B together. The fluid may now be turned on, and the pressure of the fluid will move the catches into locked position in the manner already described. Screws 16a lock the parts 6 and 12 together and also the parts 16 and 18.

While I have shown only the preferred form of my invention, it should be understood that various changes or modifications may be made within the scope of the appended claims without departing from the spirit of the invention.

I claim:

1. A coupling comprising two separable parts, one part having a tubular portion with a conical-shaped head, and a casing spaced from the head; and the other part having a tubular portion designed to make a liquid-tight connection with the first tubular portion, catches pivotally carried by the second part and engageable with the base of the cone head, pistons actuated by the pressure of the fluid in the tubular portions for urging the catches into locked position, and a casing cooperating with the first casing for forming a housing to enclose the operating elements.

2. A coupling comprising two separable parts, one part having a tubular portion with a conical-shaped head, and a casing spaced from the head; and the other part having a tubular portion designed to make a liquid-tight connection with the first tubular portion, catches pivotally carried by the second part and engageable with the base of the cone head, pistons actuated by the pressure of the fluid in the tubular portions for urging the catches into locked position, a casing cooperating with the first casing for forming a housing to enclose the operating elements, and springs for moving the pistons for swinging the catches into locked positions prior to the fluid pressure being turned on.

3. A coupling comprising two separable parts, one part having a tubular portion with a conical-shaped head, and a casing spaced from the head; and the other part having a tubular portion designed to make a liquid-tight connection with the first tubular portion, catches pivotally carried by the second part and engageable with the base of the cone head, pistons actuated by the pressure of the fluid in the tubular portions for urging the catches into locked position, a casing cooperating with the first casing for forming a housing to enclose the operating elements, and manually-controlled means for positively moving the catches into inoperative position.

4. A coupling comprising two separable parts, one part having a tubular portion with a conical-shaped head, and the other part having a tubular portion designed to make a liquid-tight connection with the first tubular portion, catches pivotally carried by the second part and engageable with the base of the cone head, and pistons actuated by the pressure of the fluid in the tubular portions for urging the catches into locked position.

5. A coupling comprising two separable parts, one part having a tubular portion with a conical-shaped head, and the other part having a tubular portion designed to make a liquid-tight connection with the first tubular portion, catches pivotally carried by the second part and engageable with the base of the cone head, pistons actuated by the pressure of the fluid in the tubular portions for urging the catches into locked position, and springs for moving the pistons for swinging the catches into locked positions prior to the fluid pressure being turned on.

6. A coupling comprising two separable parts, one part having a tubular portion with a conical-shaped head, and the other part having a tubular portion designed to make a liquid-tight connection with the first tubular portion, catches pivotally carried by the second part and engageable with the base of the cone head, pistons actuated by the pressure of the fluid in the tubular portions for urging the catches into locked position, and manually controlled means for positively moving the catches into inoperative position.

7. In a coupling, locking means including catches, a casing, plungers for moving the catches, a ring carried by the casing and having cam portions for causing the plungers to swing the catches into inoperative position when the ring is rotated with respect to the casing.

8. In a coupling, locking means including catches, a casing, plungers for moving the catches, a ring carried by the casing and having cam portions for causing the plungers to swing the catches into inoperative position when the ring is rotated with respect to the casing, and cooperating stops carried by the casing and ring for limiting the movement of the ring, the casing stops also preventing axial movement of the ring along the casing.

9. A coupling comprising two separable tubular members, a conical-shaped head carried by one member, catches carried by the other and engageable with the head, and fluid pressure actuated means controlled by the fluid pressure within the members for urging the catches into locked position, said catches acting upon the head for moving the tubular members together as the pressure of the fluid increases.

JOHN F. CANTELL.